United States Patent
Futch

(10) Patent No.: US 6,308,801 B1
(45) Date of Patent: Oct. 30, 2001

(54) TREE CLIMBING APPARATUS

(76) Inventor: John D. Futch, 1336 Talbert St., Arcadia, LA (US) 71001

( * ) Notice: Subject to any disclaimer, the term of this patent is extended or adjusted under 35 U.S.C. 154(b) by 0 days.

(21) Appl. No.: 09/491,603

(22) Filed: Jan. 26, 2000

Related U.S. Application Data

(60) Provisional application No. 60/118,536, filed on Feb. 4, 1999.

(51) Int. Cl.[7] .............................. A63B 27/00; E04G 3/00
(52) U.S. Cl. ............................................ 182/136; 182/187
(58) Field of Search ..................................... 182/134–135, 182/136, 187, 188, 116, 20

(56) References Cited

U.S. PATENT DOCUMENTS

| | | | |
|---|---|---|---|
| 2,775,489 | 12/1956 | Hagadorn | 304/28 |
| 3,338,332 | 8/1967 | Brantly, Sr. | 182/187 |
| 3,944,022 | 3/1976 | Ming | 182/20 |
| 4,137,995 | 2/1979 | Fonte | 182/135 |
| 4,168,765 | 9/1979 | Ferguson | 182/135 |
| 4,225,013 | 9/1980 | Sample | 182/34 |
| 4,428,459 | 1/1984 | Peck | 182/187 |
| 4,549,633 | 10/1985 | Merritt | 182/135 |
| 4,597,473 | 7/1986 | Peck | 182/187 |
| 4,726,447 | 2/1988 | Gibson | 182/135 |
| 4,997,063 * | 3/1991 | Bradley | 182/187 |
| 5,090,504 | 2/1992 | Amacker | 182/134 |
| 5,097,925 | 3/1992 | Walker, Jr. | 182/135 |
| 5,226,505 | 7/1993 | Woller | 182/187 |
| 5,234,076 | 8/1993 | Louk | 182/187 |
| 5,279,390 | 1/1994 | Phillips | 182/187 |
| 5,311,967 | 5/1994 | Kennedy | 182/133 |
| 5,316,104 * | 5/1994 | Amacker | 182/187 |
| 5,332,063 | 7/1994 | Amacker | 182/116 |
| 5,379,861 * | 1/1995 | Amacker | 182/187 |
| 5,433,291 * | 7/1995 | Shoestock, Sr. | 182/20 |
| 5,588,499 * | 12/1996 | Carriere | 182/135 |
| 5,590,738 | 1/1997 | Hunt | 182/116 |
| 5,641,036 | 6/1997 | Maxwell | 182/135 |
| 5,642,789 | 7/1997 | Maxwell | 182/135 |
| 5,680,910 | 10/1997 | Sarphie | 182/135 |
| 5,775,464 | 7/1998 | Gardner | 182/187 |
| 5,921,348 * | 7/1999 | Louk et al. | 182/187 |
| 5,971,104 * | 10/1999 | Woller | 182/136 |
| 6,082,492 * | 7/2000 | Yerger | 182/136 |

OTHER PUBLICATIONS

Cabelas 1996 Master Fall Catalog, PPI Grand Slam Climber, p. 366, 1996—no month available.
Ol'Man Treestands Catalog, G & G Enterprises 1996 Product Line Ol'Man Treestands Catalog, G & G Enterprises 1996 no month available.
Model TV–05 and TGV–05 no date available.

* cited by examiner

*Primary Examiner*—Daniel P. Stodola
*Assistant Examiner*—Hugh B. Thompson
(74) *Attorney, Agent, or Firm*—John M. Harrison

(57) ABSTRACT

A tree climbing apparatus which includes a climbing platform for supporting a hunter on a tree and a cooperating foot platform for engaging the tree beneath the climbing platform and intermittently supporting the hunter while the climbing platform is caused to ascend the tree. The front ends of a pivoting cable adjusting guide bar and a pivoting cable retention guide bar, respectively, are slidably mounted for lateral and medial displacement on opposite sides of each platform at the front end thereof. One end of a support cable or chain is attached to an adjusting handle slidably and adjustably mounted on the cable adjusting guide bar and the opposite end of the support cable is extended around the tree and removably secured to the cable retention guide bar. Sliding the adjusting handle rearwardly on the platform tightens the cable around the tree to secure the corresponding platform on the tree at a selected height and the tightening cable pivots the front ends of the cable adjusting and cable retention guide bars inwardly on the platform to tighten the cable around the sides of the tree. Sliding the handle or handles forwardly loosens the cable to facilitate descension of each platform on the tree. By alternately standing on the secured foot platform while raising and securing the climbing platform and sitting on the climbing platform while raising and securing the foot platform, the hunter gradually works his or her way up the tree.

20 Claims, 5 Drawing Sheets

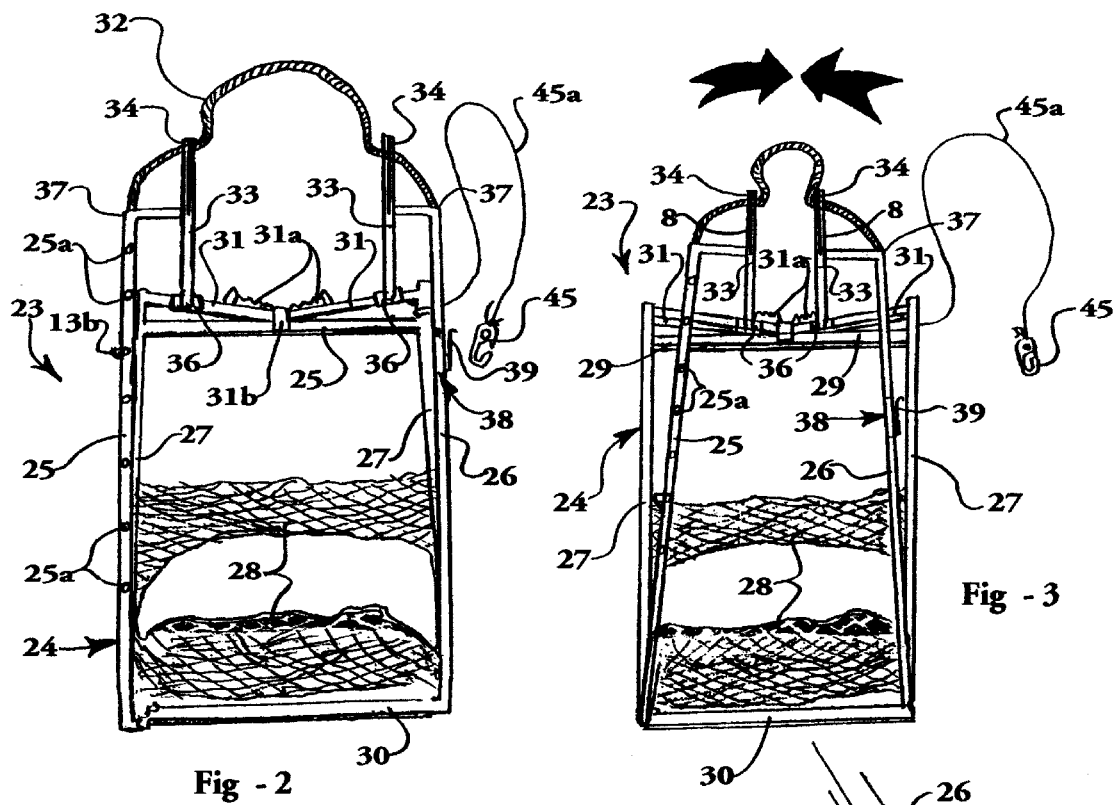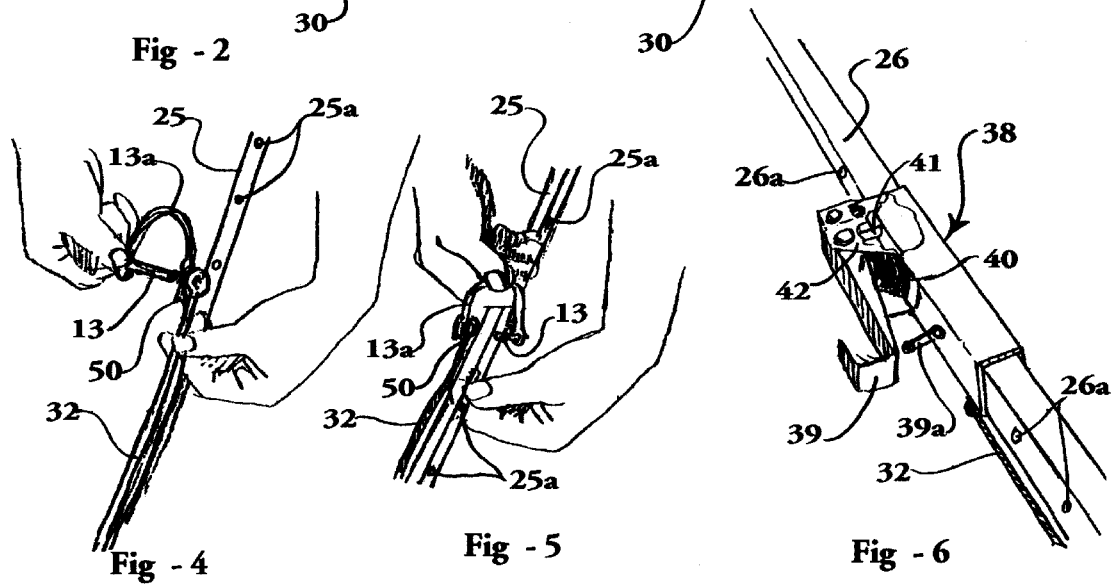

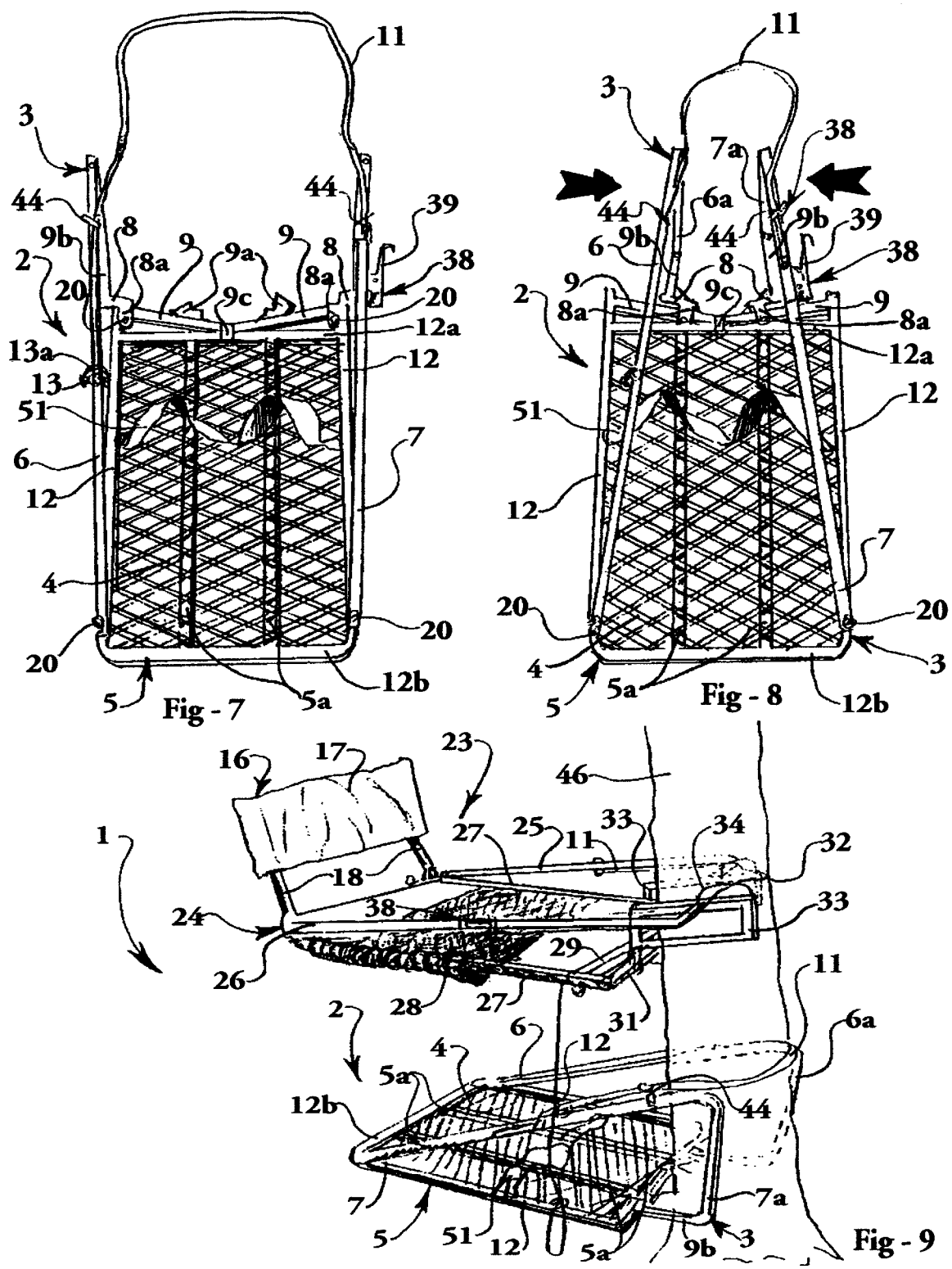

TREE CLIMBING APPARATUS

CROSS-REFERENCE TO RELATED APPLICATIONS

This application claims the benefit of copending U.S. Provisional Application Serial No. 60/118,536, filed Feb. 4, 1999.

BACKGROUND OF THE INVENTION

1. Field of the Invention

This invention relates to an apparatus for ascending and descending trees for deer hunting and the like, and more particularly, to a tree climbing apparatus characterized by a portable tree climbing platform and a cooperating foot platform, both of which engage a tree for supporting a hunter on the tree, with the climbing platform located above the foot platform. The hunter alternately stands on the foot platform and lifts and secures the climbing platform on the tree and then sits on the climbing platform to lift and secure the foot platform, in order to gradually work his or her way up the tree. Both the climbing platform and foot platform are fitted on the front end of each with tree-engaging members, or blades, for engagement and disengagement with the tree. In a preferred embodiment of the invention the rear ends of a cable adjusting guide bar and a cable retention guide bar, respectively, are pivotally attached to the rear end of each platform, on opposite sides thereof. The front ends of the pivoting cable adjusting guide bar and cable retention guide bar are slidably mounted for lateral and medial displacement on opposite sides of the corresponding platform, at the front end thereof. In a preferred embodiment, one end of a support cable is connected to a sliding adjusting handle on the cable adjusting guide bar and the opposite end of the cable is extended around the tree above the tree-engaging members, respectively, and is removably secured on the cable retention guide bar of the corresponding platform. In another embodiment, a bicycle-type support chain is connected to the adjusting handle on the cable adjusting guide bar and the opposite end of the chain is extended around the tree and removably secured to the cable retention guide bar. The adjusting handle is moved rearwardly on each platform and locked in place to tighten the cable or chain around the tree and support the corresponding platform on the tree at a selected height. As the cable or chain is tightened around the tree by operation of the handle, the front ends of the pivoting cable adjusting and cable retention guide bars, respectively, slide inwardly on the frame according to the tree diameter to automatically adjust for the size of the tree and tighten the cable or chain around the tree. Each platform is caused to ascend or descend the tree, as desired, by tilting the rear end of the secured platform upwardly, thereby disengaging the tree-engaging blades and support cable or chain from the tree; raising or lowering the platform on the tree; and then lowering the rear end of the platform to again engage the tree-engaging blades and support cable or chain with the tree at the selected height. As each platform is caused to ascend the tree, the corresponding adjusting handle is moved rearwardly on the platform to tighten the cable or chain around the tree according to the decreasing tree diameter. Conversely, as each platform is caused to descend the tree, the adjusting handle is periodically moved forwardly on the platform to loosen the cable or chain around the tree according to the increasing tree diameter. The climbing platform and foot platform of this invention are light in weight and easy to manipulate.

2. Description of the Prior Art

Various tree and pole climbing apparatuses and climbing deer stands and gun platforms, in particular, are known in the prior art. Typical of these platforms is the apparatus disclosed in U.S. Pat. No. 4,168,765 to Clarence E. Ferguson, et al. This climbing apparatus includes a hand climber which is attached to a tree or pole at a point above the user and is used in cooperation with a support platform carried by the user's feet, with the user pulling himself and the support platform up the tree or pole while grasping the hand climber and subsequently supporting himself on the support platform while manipulating the hand climber higher on the tree or pole. A similar pole climbing apparatus is illustrated in U.S. Pat. No. 4,137,995 to Frank Fonte, which apparatus includes a pair of platforms, one of which supports the feet of a user and the other positioned essentially about the waist of the user, both of which platforms engage the tree or pole to be climbed. The upper platform is initially used to support the weight of the user and the lower platform is pulled upwardly while the user's weight is supported by the upper platform, to facilitate moving up and down the pole or tree. Yet another climbing apparatus is illustrated in U.S. Pat. No. 3,944,022 to Joseph W. Ming. The Ming tree climbing stand is built of rigid sheet material and includes a pair of tubular runners secured to either side of the stand and having a treecontacting end fitted with a V-notch in the center. As in the case of the Ferguson stand, this climbing platform is fitted with a mechanism for inserting the feet, and climbing is accomplished by grasping the tree, pulling the platform upwardly with the legs and subsequently using the platform to support the legs while the user facilitates another grip higher on the tree. Descent is accomplished by reversing this climbing procedure. Yet another climbing platform is illustrated in U.S. Pat. No. 3,338,332 to H. W. Brantly. The deer stand of this patent includes a U-shaped bracing element constructed in such a manner as to have a concave inner surface rest against the front of a tree; a clamping bar which can be connected to the legs of the U-shaped bracing element at the rear of the tree; a platform supported by the U-shaped bracing element and clamping bar; and braces extending downwardly at an angle from the platform, which braces engage the trunk of the tree at a point below the U-shaped bracing element. Other climbing tree stands are detailed in U.S. Pat. No. 2,775,489, dated Dec. 25, 1956, to Hagadorn; U.S. Pat. No. 4,428,459, dated Jan. 31, 1984, to Peck; U.S. Pat. No. 4,549,633, dated Oct. 29, 1985, to Merritt; U.S. Pat. No. 4,597,473, dated Jul. 1, 1986, to Peck; U.S. Pat. No. 4,726,447, dated Feb. 23, 1988, to Gibson, et al; U.S. Pat. No. 5,090,504, dated Feb. 25, 1992, to Amacker; U.S. Pat. No. 5,097,925 dated Mar. 24, 1992, to Walker; U.S. Pat. No. 5,279,390, dated Jan. 18, 1994, to Phillips; U.S. Pat. No. 5,311,967, dated May 17, 1994 to Kennedy; U.S. Pat. No. 5,332,063, dated Jul. 26, 1994, to Amacker; U.S. Pat. No. 5,590,738, dated Jan. 7, 1997, to Hunt, et al; U.S. Pat. No. 5,641,036, dated Jan. 24, 1997, to Maxwell; U.S. Pat. No. 5,642,789, dated Jul. 1, 1997, to Maxwell; and U.S. Pat. No. 5,775,464, dated Jul. 7, 1998, to Gardner. None of the devices disclosed in those patents includes a mechanism for automatically tightening a platform support cable around a tree having a given diameter. U.S. Pat. No. 5,226,505, dated Jul. 13, 1993, to Donald R. Woller, et al, details a "Portable Climbing Platform" characterized by a pair of pivoting arms provided on opposite sides of a frame, the front ends of which arms are spanned by a pair of tree-engaging blades adjustably joined to each other. The front ends of the arms can be displaced laterally or medially, and the blades adjusted with respect to each other, to accommodate a tree having a given diameter. U.S. Pat. No. 5,234,076, dated Aug. 10, 1993, to Robert L. Louk, details a "Tree Stand", including a climbing platform for supporting a hunter on a tree and a foot platform for engaging the tree beneath the climbing platform. A folding support on each side of each frame can be pivoted between horizontal and vertical positions, and a flexible steel cable extends from one support around the tree and is removably fastened to the other support to secure the corresponding platform on the tree. The supports pivot on the platform to conform the loop width of the cable with a tree having a given diameter.

Many of the prior art climbing platforms, and portable climbing stands in particular, suffer from the disadvantages of being relatively complicated and sometimes heavy, which are severe disadvantages to a hunter, who must depend upon mobility in order to assure access to the areas frequented by wild game such as deer. Furthermore, some of the prior art devices, while light in weight, are not structurally sound and are insufficiently large for relative positioning of the hunter and many do not include sufficient safety features which are necessary for the average hunter.

Accordingly, it is an object of this invention to provide a new and improved tree climbing apparatus which is characterized by a high degree of safety, ease of manipulation and transportation and facilitates great comfort and multiple position capability for the user when in position on a tree or pole.

Another object of this invention is to provide a new and improved portable climbing platform which can be quickly and easily transported to a desired hunting area and removably attached and automatically adjusted to a tree or pole and a cooperating foot platform removably attached to the tree or pole beneath the climbing platform, wherein the user alternately stands on the foot platform and lifts and secures the climbing platform and then sits on the climbing platform to lift and secure the foot platform in order to work his or her way up and down the tree or pole.

Yet another object of this invention is to provide an efficient tree climbing apparatus having a climbing platform and cooperating foot platform, which climbing platform and foot platform are each characterized by a generally rectangular-shaped frame for supporting a hunter while the hunter ascends a tree or pole, a V-shaped blade or engaging bar provided on the frame for cooperative engagement with the tree, and a cable extending around the tree above the blade and through self-adjusting guide members to provide self-adjusting, safe and firm support of the climbing platform and foot platform on the tree.

Still another object of this invention is to provide a tree climbing platform having a pair of pivotally-mounted cable guide bars and a cooperating foot platform, which are each amenable to easy and efficient manipulation in order to facilitate repetitive adjustment in the attitude and height of the two platforms on a tree.

A further object of this invention is to provide a new and improved tree climbing platform and cooperating foot platform which are each characterized by a frame having a tree-engaging blade or bar provided on the front end of the frame for engaging a tree; a pivoting cable adjusting guide bar, the front end of which is slidably mounted for lateral and medial displacement on one side of the corresponding platform at the front end thereof; a pivoting cable retention guide bar, the front end of which is slidably mounted for lateral and medial displacement on the other side of the corresponding platform at the front end thereof; and a support cable or bicycle-type support chain having one end attached to a cable adjusting handle slidably and adjustably mounted on the cable adjusting guide bar. The other end of the cable or chain is extended around the tree and removably attached to the cable retention guide bar and the cable or chain is tightened by means of the cable-adjusting handle to support the user at a selected height on the tree as the tightening cable or chain slides the front ends of the pivoting cable adjusting and cable retention guide bars inwardly on the corresponding frame, to tighten the cable or chain around a tree having a given diameter.

Another object of this invention is to provide an adjustable tree climbing apparatus including a climbing platform and foot platform which cooperate to facilitate multiple selected sitting and standing positions for a user, both facing a tree or pole and facing away from the tree or pole, which foot support platform supports the user in the standing positions and which climbing platform supports the user in one of several sitting positions.

SUMMARY OF THE INVENTION

These and other objects of the invention are provided in a tree climbing apparatus including a climbing platform and cooperating foot platform, each of which includes a platform frame provided with a generally V-shaped tree-engaging bar or blade on the front end of the frame for engaging a tree. A cable adjusting guide bar is pivotally attached to the rear end of the corresponding frame on one side of each platform and a cable retention guide bar is pivotally attached to the rear end of the corresponding frame on the opposite side of each platform. The front ends of the cable adjusting and cable retention guide bars, respectively, are slidably mounted on the respective frames for lateral and medial displacement on opposite sides of the corresponding platform frame, at the front end thereof. One end of a support cable or bicycle type support chain is attached to a cable adjusting handle slidably and adjustably mounted on the cable adjusting guide bar on each platform and the other end of the cable or chain is extended around the tree and removably attached to the cable retention guide bar on the corresponding platform. The support cable or chain engages the opposite side of the tree above the blade or bar for supporting the climbing platform or foot platform at a selected height on the tree. As the cable or chain is tightened around the tree by operation of the handle, the front ends of the pivoting cable adjusting and cable retention guide bars slide inwardly on the platform according to the tree diameter to tighten the cable or chain around the sides of the tree. The climbing platform and foot platform are alternatively moved higher on the tree in "inchworm" fashion, until both are positioned at a selected height on the tree for hunting.

BRIEF DESCRIPTION OF THE DRAWINGS

The invention will be better understood by reference to the accompanying drawings, wherein:

FIG. 2 is a top view of the climbing platform of another embodiment of the tree climbing apparatus, with the pivoting cable adjusting and cable retention guide bars positioned on the platform as if to tighten the support cable around a tree having a large diameter;

FIG. 3 is a top view of the climbing platform of the tree climbing apparatus illustrated in FIG. 2, with the pivoting cable adjusting and cable retention guide bars positioned on the platform as if to tighten the support cable around a tree having a small diameter;

FIG. 4 is an enlarged, sectional view of the cable retention guide bar on the climbing platform of the tree climbing apparatus, more particularly detailing attachment of the support cable component after extension around a tree, to a cable retention bolt prior to securing the cable retention bolt on the cable retention guide bar, in a preferred technique for securing the support cable to the cable retention guide bar;

FIG. 5 is an enlarged, sectional view of the cable retention guide bar illustrated in FIG. 4, more particularly detailing attachment of the cable retention bolt and attached support cable to the cable retention guide bar;

FIG. 6 is a perspective view, partially in section, of a cable adjusting handle element of a preferred embodiment of the tree climbing apparatus of this invention;

FIG. 7 is a top view of a typical foot platform of the tree climbing apparatus, with the pivoting cable adjusting and cable retention guide bars positioned on the platform as if to tighten the support cable around a tree having a large diameter;

FIG. 8 is a top view of the foot platform of the tree climbing apparatus illustrated in FIG. 7, with the pivoting cable adjusting and cable retention guide bars positioned on the platform as if to tighten the support cable around a tree having a small diameter;

FIG. 9 is a perspective view of a preferred embodiment of the tree climbing apparatus, illustrating the climbing platform and foot platform in initial climbing position on a tree at a selected height above the ground;

DESCRIPTION OF THE PREFERRED EMBODIMENTS

Figure 1:
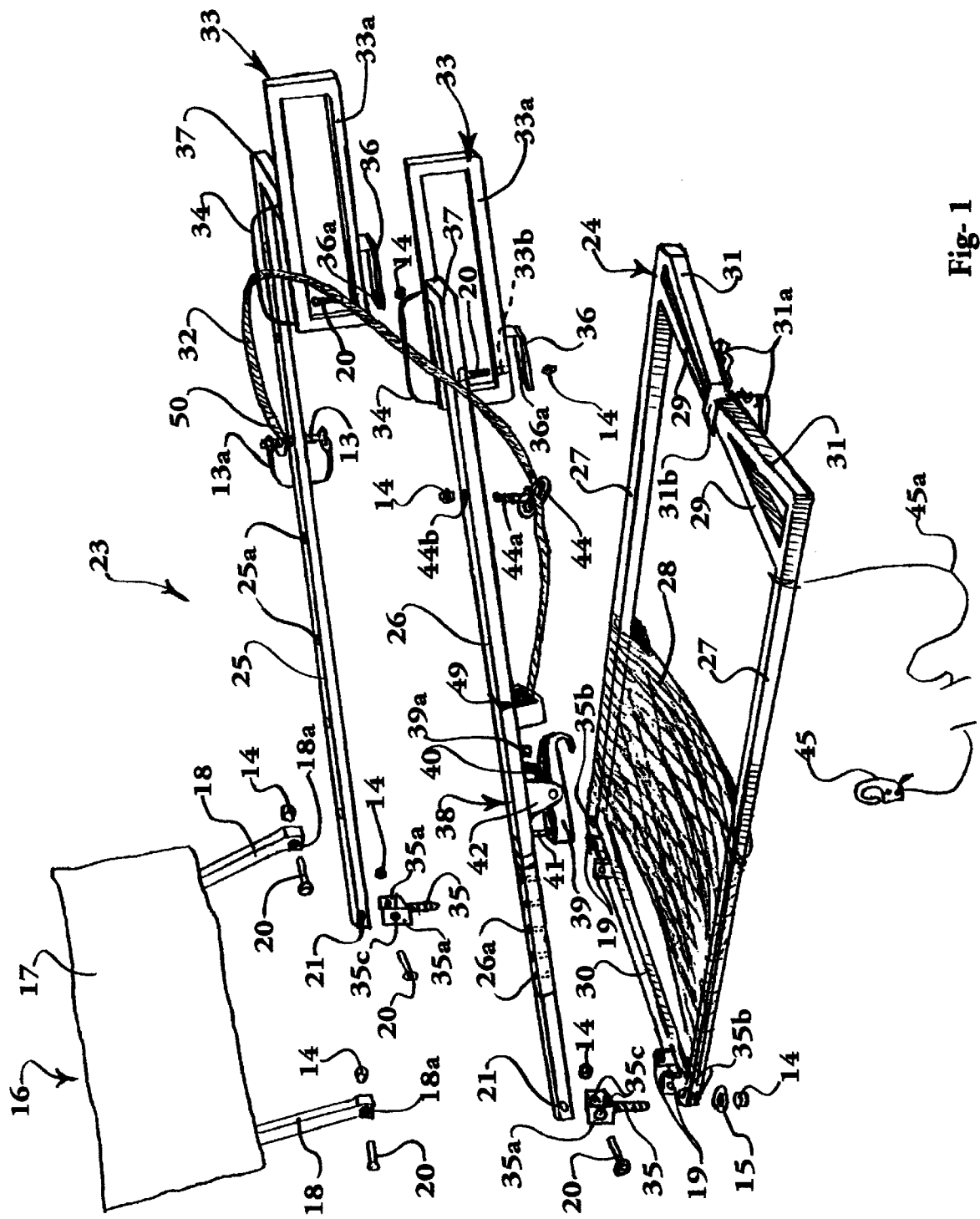
FIG. 1 is an exploded, perspective view of the climbing platform of a preferred embodiment of the tree climbing apparatus of this invention.

Referring initially to FIGS. 1–9 of the drawings, in a preferred embodiment, the tree climbing apparatus of this invention is generally illustrated by reference numeral 1. As illustrated in FIG. 9, the tree climbing apparatus 1 includes a climbing platform 23, shown situated in engagement with a tree 46, and a foot platform 2, shown likewise situated in engagement with the tree 46, below the climbing platform 23. The climbing platform 23 is characterized by a generally rectangular climbing platform frame 24, typically constructed of steel or, preferably, aluminum, square tubing. The climbing platform frame 24 includes a pair of spaced-apart, parallel seat support bars 27, typically spanned by a rear brace bar 30 and a front brace bar 29, as illustrated in FIG. 1. Blade mount bars 31, each having one end welded or otherwise fixedly or removably attached to the extending end of the corresponding seat support bar 27, angle rearwardly and terminate adjacently on the front brace bar 29, forming a generally V-shaped configuration. A tree-engaging blade 31a is mounted on each blade mount bar 31 and the front brace bar 29, typically by means of a blade mount clamp 31b, for receiving and engaging the tree 46, as hereinafter further described. In a preferred embodiment of the tree climbing apparatus 1 illustrated in FIG. 1, a backrest 16, characterized by a pair of spaced-apart backrest arms 18, spanned by a typically fabric or flexible net backing 17, is typically removably attached to the rear end of the climbing platform frame 24. The bottom end of each backrest arm 18 is inserted between a corresponding pair of spaced-apart backrest attachment flanges 19, provided on the rear brace bar 30, adjacent to each end thereof. A bolt 20 is extended through a pair of aligned flange openings (not illustrated) provided in each pair of backrest attachment flanges 19 and a registering seat arm bolt opening 18a, provided in the lower end of the corresponding, vertical backrest arm 18, and a nut 14 is threaded on each bolt 20, to removably secure the backrest 16 to the climbing platform frame 24.

A cable retention guide bar 25 and a cable adjusting guide bar 26 are pivotally mounted at the rear end of each, to the rear brace bar 30 on each side of the climbing platform frame 24, as hereinafter further described. A guide bar clevis 35 provided with a pair of spaced-apart clevis flanges 35a, is extended through a corresponding guide bar clevis opening 35b located at each end of the rear brace bar 30, as illustrated in FIG. 1, and secured therein by means of a flat washer 15 and a nut 14, threaded on the guide bar clevis 35. The rear ends of the cable retention guide bar 25 and the cable adjusting guide bar 26 are placed between the clevis flanges 35a of the corresponding, fastened guide bar clevis 35. A bolt 20 is extended through aligned flange openings 35c provided in the respective clevis flanges 35a and through a registering guide bar bolt opening 21 provided in the rear end of the corresponding cable retention guide bar 25 and cable adjusting guide bar 26. A nut 14 is threaded on the extended bolt 20 to secure the cable retention guide bar 25 and cable adjusting guide bar 26 between the clevis flanges 35a of the corresponding guide bar clevis 35. The front end of each cable retention guide bar 25 and cable adjusting guide bar 26 bends perpendicularly inwardly at a bend 37 and the forward end of each cable retention guide bar 25 and cable adjusting guide bar 26 terminates on a corresponding, typically rectangular, guide bar connecting frame 33. A frame connecting flange 36, provided on the underside of the bottom frame member 33a of each guide bar connecting frame 33, receives the blade mount bar 31 of the climbing platform frame 24, on the corresponding side of the blade mount clamp 31b. A bolt 20 is extended downwardly through a bolt opening 33b provided in the bottom frame member 33a of the guide bar connecting frame 33 and through a flange bolt opening 36a provided in the frame connecting flange 36, which bolt 20 extends adjacent to the blade mount bar 31 and receives a nut 14 to secure each guide bar connecting frame 33 on the corresponding blade mount bar 31. Accordingly, each guide bar connecting frame 33 is slidably mounted for lateral and medial displacement on the corresponding blade mount bar 31 and the cable retention guide bar 25 and cable adjusting guide bar 26 can be pivoted with the corresponding guide bar clevis 35, between the laterally-disposed position illustrated in FIG. 2 and the medially-disposed position illustrated in FIG. 3, for purposes which will be hereinafter further described. As illustrated in FIGS. 1 and 6, a cable adjusting handle 38 is slidably and adjustably mounted on the cable adjusting guide bar 26 and includes an adjusting lever 39 (FIG. 6), which is pivotally mounted on a fulcrum 42, provided on the underside of the cable adjusting handle 38, as illustrated in FIG. 1, or alternatively, on the side of the cable adjusting handle 38, as illustrated in FIGS. 2 and 3. One end of the adjusting lever 39 is biased away from the cable adjusting guide bar 26 by means of a spring 40. A handle retention pin 41, extending from the other end of the lever 39, is normally inserted in one of a selected number of pin openings 26a, provided at spaced intervals in the bottom surface (FIG. 1) or side surface (FIGS. 2 and 3) of the cable adjusting guide bar 26, to secure the cable adjusting handle 38 at a selected location along the cable adjusting guide bar 26, as hereinafter further described. As further illustrated in FIG. 1, a support cable 32 extends from typically bolted attachment at one end to a retention flange 49 provided on the underside of the cable adjusting handle 38, beneath the cable adjusting guide bar 26 and the other end of the support cable 32 extends through a cable guide loop 44 provided on a threaded cable guide bolt 44a, secured in a guide bolt opening 44b provided in the cable adjusting guide bar 26, near the front end thereof, by means of a threaded nut 14. As illustrated in FIG. 1, the support cable 32 is extended through a cable guide 34 provided on each guide bar connecting frame 33 and is removably attached to the cable retention guide bar 25, as hereinafter described.

Figure 14:
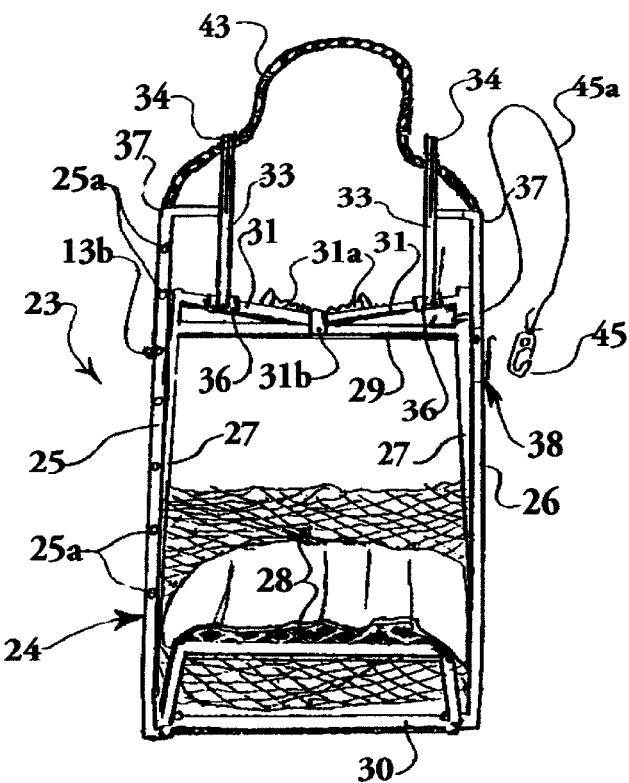
FIG. 14 is a top view of the climbing platform of another embodiment of the tree-climbing apparatus of this invention.

In another embodiment of the tree-climbing apparatus 1 illustrated in FIG. 14, the support cable 32 of the climbing platform 23 is replaced by a bicycle-type support chain 43, which extends from fixed attachment at one end to the cable adjusting handle 38 and through the cable guide loop 44, provided on the cable adjusting guide bar 26. The support chain 43, like the support cable 32 of the climbing platform 23 described above and illustrated in FIGS. 1 and 2, is extended through the cable guide 34 provided on each guide bar connecting frame 33, and removably attached to the cable retention guide bar 25, as hereinafter described. As illustrated in FIGS. 1–3, a safety clip 45 is optionally attached by means of a safety clip cable 45a, to the climbing platform frame 24 to facilitate tethering the foot platform 2 to the tree-mounted climbing platform frame 24 and prevent the foot platform 2 from inadvertently dropping from the climbing platform 23, to the ground.

In application, as hereinafter further described, the tree-engaging blades 31a are initially caused to engage the tree 46, the support cable 32 or support chain 43 (FIG. 14) is extended through the cable guide 34 provided on the guide bar connecting frame 33 of the cable adjusting guide bar 26, around the tree 46 and through the cable guide 34 provided on the guide bar connecting frame 33 of the cable retention guide bar 25. A retention tab 50, provided on the extending end of the support cable 32 or support chain 43, is inserted on a cable retention bolt 13 fitted with a bolt keeper 13a, as illustrated in FIG. 4. The cable retention bolt 13 is then extended through a selected one of multiple, spaced retention openings 25a provided in the cable retention guide bar 25, which retention openings 25a are selected according to the desired tension of the support cable 32 around the thickness or girth of the tree 46. The bolt keeper 13a is then re-positioned on the cable retention bolt 13, to prevent the retention tab 50 from slipping off the cable retention bolt 13 and secure the support cable 32 or support chain 43 to the cable retention guide bar 25, as illustrated in FIG. 5. It is understood that because the support cable 32 extends through the respective cable guide loops 44, connected to the cable retention guide bar 25 and cable adjusting guide bar 26, pressure on the support cable 32 forces the cable retention guide bar 25 and the cable adjusting guide bar 26 inwardly against the tree to create a naturally-occurring pinching effect. This pinching effect is generated by the cable configuration, which creates the clamping effect and stabilizes the tree climbing apparatus on the tree 46. Furthermore, the bends 37 in the respective cable retention guide bar 25 and the cable adjusting guide bar 26 create additional space for the hunter when the hunter is sitting in the seats 28 with his back to the tree 46.

Referring now to FIGS. 1–3 of the drawings, one or a pair of seats 28, typically constructed from a durable fabric or flexible net, spans the seat support bars 27 of the climbing platform frame 24. As illustrated in FIGS. 2 and 3, when two seats 28 span the seat support bars 27, one of the seats 28 is typically located adjacent to the front brace bar 29 and the other adjacent to the rear brace bar 30, of the climbing platform frame 24, upon which seats 28 the hunter sits when the climbing platform 23 is supported on the tree 46. It will be appreciated that the hunter may sit on the climbing platform 23 facing either of two directions. By sitting on the rear seat 28, the hunter faces the tree 46 and by sitting on the front seat 28, the hunter faces away from the tree 46.

Figures 10, 11, 12:
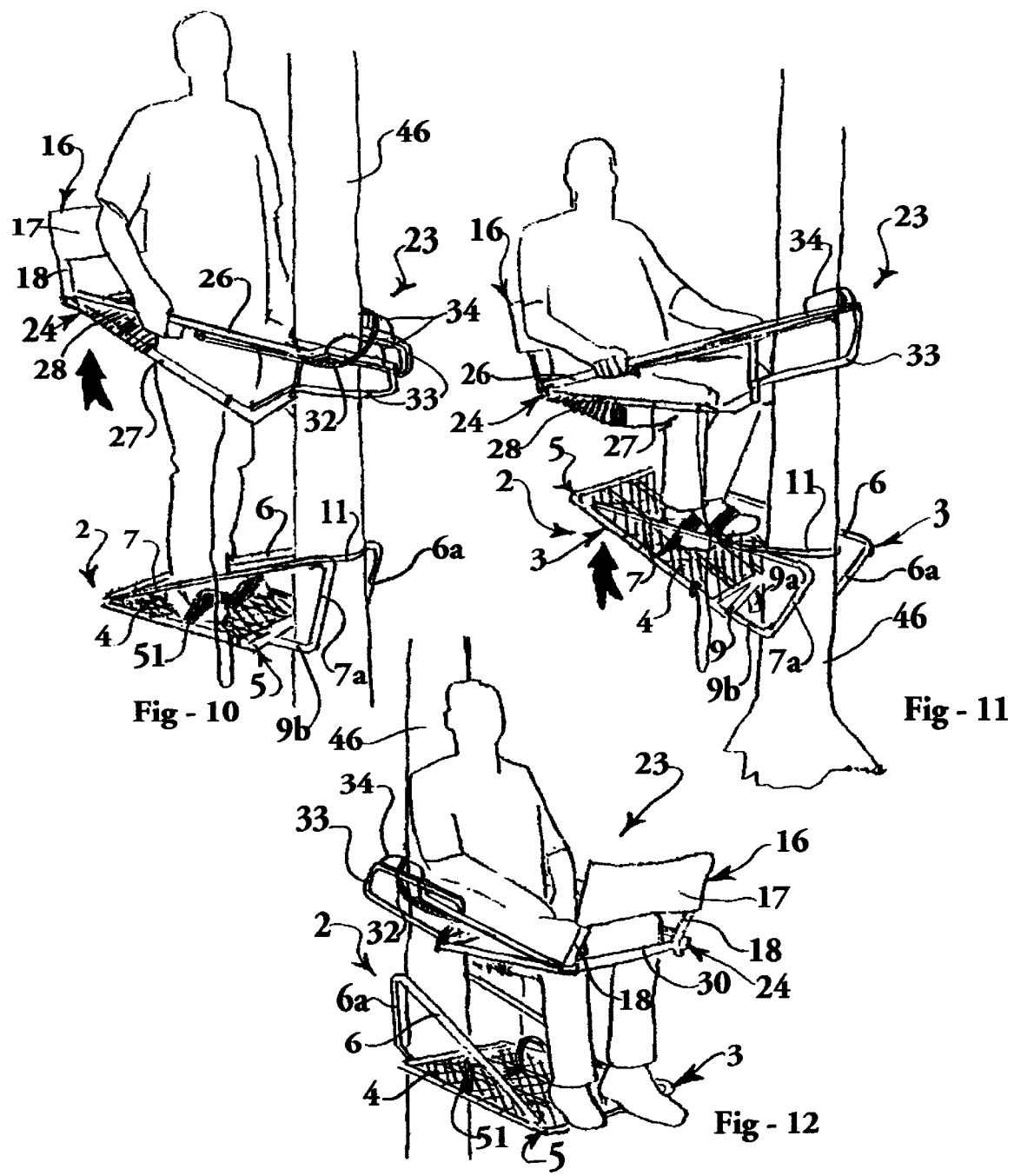
FIG. 10 is a perspective view of the tree climbing apparatus illustrated in FIG. 9, more particularly detailing raising the climbing platform to a selected, higher location on the tree.
FIG. 11 is a perspective view of the tree climbing apparatus illustrated in FIG. 9, more particularly detailing lifting the foot platform to a selected, higher location on the tree.
FIG. 12 is a perspective view of the tree climbing apparatus positioned at a selected height on the tree.

Referring again to FIGS. 4–9 of the drawings, the foot platform 2 of the tree climbing apparatus 1 is characterized by a foot platform frame 3, generally constructed in the same manner as the climbing platform frame 24, typically from steel or aluminum tubing. The foot platform frame 3 includes a rectangular mesh frame 5, characterized by a pair of spaced-apart, parallel mesh frame side members 12 spanned by a front frame member 12a and a rear frame member 12b. The front frame member 12a and rear frame member 12b are spanned by a pair of parallel mesh frame braces 5a and a rigid, expanded metal foot support mesh 4 is typically welded on the mesh frame 5 and supported by the mesh frame braces 5a. Blade mount bars 9 angle rearwardly from the extending front ends of the respective mesh frame side members 12 of the mesh frame 5, terminating adjacently on the front end of the front mesh frame member 12a and forming a substantially V-shaped configuration. A pair of tree-engaging blades 9a is mounted on the respective blade mount bars 9, typically by means of a blade mount clamp 9c, for receiving and engaging the tree 46 beneath the climbing platform 23, as illustrated in FIG. 9. The rear ends of a cable retention guide bar 6 and a cable adjusting guide bar 7, respectively, are pivotally attached typically by means of bolts 20, as illustrated in FIGS. 7 and 8, to the respective mesh frame side members 12 of the mesh frame 5, adjacent to the rear frame member 12b. The front ends of the cable retention guide bar 6 and cable adjusting guide bar 7 extend downwardly as a vertical front retention guide support 6a and front adjusting guide support 7a, respectively, as illustrated in FIG. 9. A support extension 9b extends rearwardly from the bottom end of the front retention guide support 6a and front adjusting guide support 7a, respectively, and each terminates in a connecting bar 8, each of the latter provided with a bottom connecting flange (not illustrated) and a top connecting flange 8a, as illustrated in FIGS. 7 and 8. As further illustrated in FIG. 7, a bolt 20 is extended downwardly through aligned bolt openings (not illustrated) provided in the top connecting flange 8a and bottom connecting flange (not illustrated) of each pair, adjacent to the blade mount bar 9, and receives a nut (not illustrated) to slidably secure each connecting bar 8 on the blade mount bar 9 on the corresponding side of the blade mount clamp 9c. Accordingly, the cable retention guide bar 6 and cable adjusting guide bar 7 are slidably mounted for lateral and medial displacement on the respective blade mount bars 9 and can be pivoted between the laterally-disposed position illustrated in FIG. 7 and the medially-disposed position illustrated in FIG. 8, for purposes which will be hereinafter further described. A pair of foot straps 51 is typically provided on the foot support mesh 4 for receiving the feet of the hunter to facilitate lifting the foot platform 2 on the tree 46, as illustrated in FIG. 11 and hereinafter further described.

A cable adjusting handle 38 is slidably and adjustably mounted on the cable adjusting guide bar 7 and, like the cable adjusting handle 38 on the cable adjusting guide bar 26 of the climbing platform 23, includes an adjusting lever 39 (illustrated in FIG. 6), pivotally mounted on a fulcrum 42, provided on the side or bottom surface of the cable adjusting handle 38, as illustrated in FIG. 6 with respect to the cable adjusting handle 38 described above with respect to the climbing platform 23. Accordingly, one end of the adjusting lever 39 is biased away from the cable adjusting guide bar 7 by means of a spring 40 (FIG. 6) and the opposite end of the adjusting lever 39 includes a handle retention pin 41, normally inserted in a selected one of multiple pin openings 26a, provided at spaced intervals on the side or bottom surface of the cable adjusting guide bar 7, as described above with respect to the cable adjusting guide bar 26 of the climbing platform 23 illustrated in FIG. 6. One end of a support cable 11 is typically bolted to the bottom surface of the cable adjusting handle 38. As illustrated in FIGS. 7 and 8, the other end of the support cable 11 extends forwardly through a cable guide loop 44 provided near the front end of the cable adjusting guide bar 7, as described above and illustrated in FIG. 1 with respect to the climbing platform 23 and through a second cable guide loop 44 provided near the front end of the cable retention guide bar 6. The extending end of the support cable 11 terminates in a retention tab 50, which is inserted on a cable retention bolt 13 (as illustrated in FIG. 4 and described above with respect to the climbing platform 23), removably inserted and secured in a selected retention opening 25a provided in the cable retention guide bar 6.

As described above with respect to the climbing platform 23 illustrated in FIG. 14, in another embodiment of the tree climbing apparatus 1, the support cable 11 of the foot platform 2 is replaced by a bicycle-type support chain (not illustrated) having one end typically bolted to the cable adjusting handle 38. The other end of the support chain (not illustrated) extends forwardly through the cable guide loop 44 provided on the cable adjusting guide bar 7 and through the second cable guide loop 44 provided on the cable retention guide bar 6, in the same manner as the support cable 32 of the climbing platform 23 described above and illustrated in FIGS. 7 and 8. The extending end of the support chain (not illustrated) terminates in a retention tab 50, which is inserted on a cable retention bolt 13, removably inserted and secured in a selected retention opening 25a provided in the cable retention guide bar 6, as described above and illustrated in FIGS. 4 and 5.

In the course of mounting the foot platform 2 on the tree 46, the tree-engaging blades 9a of the foot platform 2 are initially positioned to engage the tree 46. The free end of the support cable 11 or support chain (not illustrated) is then extended around the tree 46 and through the cable guide loop 44 provided on the cable retention guide bar 6 and the retention tab 50 is inserted on the cable retention bolt 13, as illustrated in FIG. 4. The cable retention bolt 13 is then extended through a selected pair of retention openings 25a provided in the cable adjusting guide bar 7, which pair of retention openings 25a is selected according to the thickness or girth of the tree 46. The bolt keeper 13a is then replaced on the cable retention bolt 13, as illustrated in FIG. 5, to retain the support cable 11 or support chain on the cable retention guide bar 6 as the foot support platform 2 is supported on the tree 46. The climbing platform 23 is then secured to the tree 46 above the foot platform 2 in like manner, as hereinafter further described.

Referring again to FIGS. 4–6 and to FIGS. 10–12 of the drawings, in typical detailed mounting and climbing application, the foot support platform 2 is positioned on the tree 46 as described above. Accordingly, the tree-engaging blades 31a of the foot platform frame 3 are initially caused to engage the tree 46. The support cable 11 or support chain (not illustrated) is then extended around the tree 46 and through the cable guide loop 44 provided on the cable retention guide bar 6, and the retention tab 50 is inserted on the cable retention bolt 13 and secured as illustrated in FIGS. 4 and 5 and heretofore described. The support cable 11 or support chain is next tightened around the tree 46 by first pivoting the projecting end of the adjusting lever 39 of the cable adjusting handle 38 toward the cable adjusting guide bar 7, thereby removing the handle retention pin 41 from the pin opening 26a, and sliding the cable adjusting handle 38 rearwardly on the cable adjusting guide bar 7, and then inserting the handle retention pin 41 in another pin opening 26a, by releasing the spring-biased adjusting lever 39. The tightening support cable 11 or support chain causes the cable retention guide bar 6 and cable adjusting guide bar 7 to pivot between the outwardly-disposed position illustrated in FIG. 7 and the inwardly-disposed position illustrated in FIG. 8, according to the girth of the tree 46, such that the support cable 11 or support chain firmly engages the rear and side portions of the tree 46.

Next, the climbing platform 23 is positioned on the tree above the foot platform 2. Accordingly, after the free end of the support cable 32 or support chain 43 (FIG. 14) of the climbing platform 23 is extended through the cable guide 34 provided on the guide bar connecting frame 33 of the cable adjusting guide bar 26, the tree-engaging blades 31a of the climbing platform frame 24 are caused to engage the tree 46 above the foot platform 2. The support cable 32 or support chain 43 of the climbing platform 23 is extended around the tree 46 and through the cable guide 34 provided on the guide bar connecting frame 8 of the cable retention guide bar 25 and the retention tab 50 is inserted on the cable retention bolt 13 and secured as illustrated in FIGS. 4 and 5 and described above with respect to the foot platform 2. The support cable 32 or support chain 43 is tightened around the tree 46 by adjusting the cable adjusting handle 38 rearwardly on the cable adjusting guide bar 26, in the manner described above with respect to the foot platform 2. The tightening support cable 32 or support chain 43 causes the cable retention guide bar 25 and cable adjusting guide bar 26 to pivot between the outwardly-disposed position illustrated in FIG. 2 and the inwardly-disposed position illustrated in FIG. 3, according to the girth of the tree 46, such that the support cable 32 or support chain 43 always firmly engages the rear and side portions of the tree 46. The climbing platform 23 is thusly supported in functional configuration on the tree 46 above the foot platform 2, as illustrated in FIG. 9. As illustrated in FIG. 10, the hunter then steps onto the mounted foot platform 2 and places his or her feet in the foot straps 51, with his or her legs between the seat support bars 27 of the climbing platform frame 24 and he or she lifts the rear end of the mounted climbing platform 23 in the direction of the arrow. This tilting movement removes the support cable 32 or support chain 43 from tensioned engagement with the tree 46, after which the tree-engaging bars 31 are removed from engagement with the tree 46 to facilitate positioning the climbing platform 23 and attached support cable 32 or support chain 43 at a higher position on the tree 46, as illustrated in FIG. 11. This is effected by lifting the climbing platform 23 and then lowering the rear end of the climbing platform 23 at the selected higher location on the tree 46, thereby causing the tree-engaging bars 31 and support cable 32 on support chain 43 to again securely engage the tree 46. The hunter then sits on the seat 28 of the secured climbing platform 23, places his or her feet beneath the foot strap 51 on the foot platform frame 3 and raises his or her feet as he or she sits on the seat 28, to tilt the foot platform 2 forwardly and remove the support cable 11 or support chain (not illustrated) from engagement with the tree 46. The tree-engaging blades 9a are also removed from engagement with the tree 46 to facilitate lifting the foot platform 2 in the direction of the arrow to a higher position on the tree 46. The rear end of the foot platform 2 is lowered as weight is re-applied to the foot platform 2 to secure the foot platform 2 on the tree 46 at the higher level. By repeating the climbing technique described above, the hunter alternately raises the climbing platform 23 and foot support platform 2 in "inch-worm" fashion to a selected height on the tree 46 for hunting deer or other game. As the diameter of the tree 46 becomes smaller upon ascending the tree 46, the cable adjusting guide bars 26 and 7 and cable retention guide bars 25 and 6 pivot inwardly on the respective climbing platform 23 and foot platform 2, as illustrated in FIGS. 3 and 8, respectively, such that the support cables 32 and 11, respectively, or support chain 43 on the climbing platform 23 and support chain (not illustrated) provided on the foot platform 2, respectively, tighten against the rear and sides of the tree 46. This causes the climbing platform 23 and foot platform 2 to assume an upwardly-sloped position on the tree 46, with the rear end of the corresponding platform located at a lower level than the front, tree-engaging end of the platform. Accordingly, the cable adjusting handles 38 on both the climbing platform 23 and the foot platform 2 are manipulated to slide rearwardly on the respective cable adjusting guide bars 26 and 7, and maintain the climbing platform 23 and foot platform 2 at a level position on the tree 46 and yet insure a tight fit of the support cables 32 and 11, respectively, or support chain 43, on the climbing platform 23 and support chain on the foot platform 2, around the rear and sides of the tree 46. The hunter descends the tree 46 by reversing the climbing process described above, alternately lowering the climbing platform 23 and foot support platform 2 until he or she reaches the ground. As the diameter of the tree 46 becomes larger upon descending the tree 46, the cable adjusting guide bars 26 and 7 and cable retention guide bars 25 and 6 pivot outwardly on the respective climbing platform 23 and foot platform 2, as illustrated in FIGS. 2 and 7, respectively, to conform the loop width of the support cables 32 and 11, respectively, or support chain 43 on the climbing platform 23 and support chain on the foot platform 2, respectively, to the increasing tree diameter. This causes the climbing platform 23 and foot platform 2 to assume a downwardly-sloped position on the tree 46, with the rear end of the corresponding platform located at a higher level than the front, tree-engaging end of the platform. Accordingly, the cable adjusting handles 38 on both the climbing platform 23 and the foot platform 2 are manipulated to slide forwardly on the respective cable adjusting guide bars 26 and 7 to maintain the climbing platform 23 and foot platform 2 at a level position on the tree 46 and yet maintain a tight fit of the support cables 32 and 11, respectively, or support chain 43 on the climbing platform 23 and support chain on the foot platform 2, respectively, around the rear and sides of the tree 46.

Figure 13:
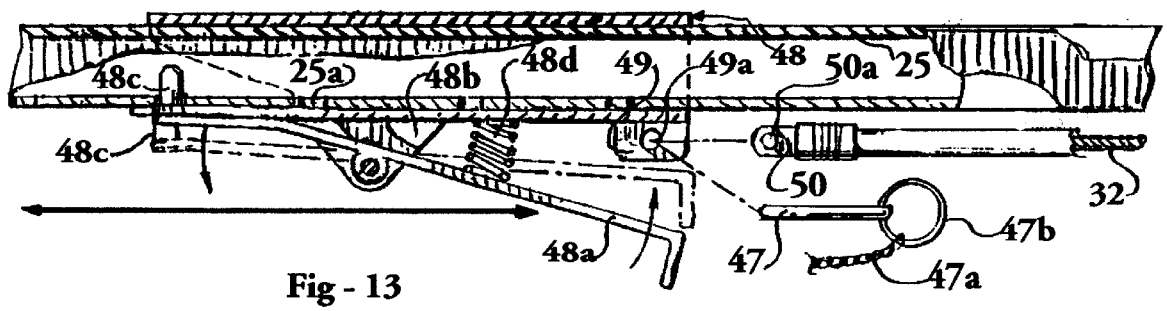
FIG. 13 is a side view detail, partially in section, of a cable retention handle element of a preferred embodiment of the tree climbing apparatus of this invention.

Referring next to FIGS. 13 and 14 of the drawings, in another preferred embodiment of the invention the extending end of the support cable 32 or support chain 43 of the climbing platform 23 is removably attached to a cable retention handle 48, slidably mounted on the cable retention guide bar 25 of the climbing platform 23, opposite the cable adjusting handle 38 on the cable adjusting guide bar 26, for enhancing the adjusting capability of the support cable 32 or support chain 43 around the tree 46. The cable retention handle 48 includes an adjusting lever 48a, which is pivotally mounted on a fulcrum 48b, provided on the bottom surface of the cable retention handle 48, and one end of the adjusting lever 48a is biased downwardly by means of a spring 48d. A locking peg 48c extends upwardly from the other end of the lever 48a and inserts in one of at least three pairs of retention openings 25a provided at spaced intervals in the bottom surface of the cable retention guide bar 25. A pair of spaced-apart retention flanges 49 extends downwardly from the front end of the cable retention handle 48 on each side thereof and a pair of aligned flange openings 49a is included in the retention flanges 49. The extending end of the support cable 32 or support chain 43 terminates by a weld in a retention tab 50. After extension around the tree 46, the retention tab 50 is inserted through a cable guide loop (not illustrated), provided on the end of the cable retention guide bar 25 and then positioned between the retention flanges 49, where a tab opening 50a, provided in the retention tab 50, is aligned with the retention flange openings 49a. A lock pin 47 is then extended through the flange openings 49a and aligned tab opening 50a to retain the retention tab 50 between the retention flanges 49. Sliding the cable retention handle 48 forwardly or rearwardly on the cable retention guide bar 25 and inserting the locking peg 48c in one of the retention openings 25a enhances the user's ability to tighten and loosen the support cable 32 or support chain 43 around the tree 46 when the cable retention handle 48 is used in combination with the cable adjusting handle 38 provided on the cable adjusting guide bar 26 and enables the user to adjust the climbing platform 23 to a level position on any tree 46 and particularly, a tree having a large variation in diameter from the base to top. It will be appreciated that in this embodiment, a cable retention handle 48 may be likewise provided on the cable retention guide bar 6 of the foot platform frame 3, for providing the same benefits in adjusting the support cable 11 or support chain (not illustrated) around the tree 46 during raising and lowering the foot platform 2 on the tree 46.

While the preferred embodiments of the invention have been described above, it will be recognized and understood that various modifications may be made in the invention and the appended claims are intended to cover all such modifications which may fall within the scope and spirit of the invention.

Having described my invention with the particularity set forth above, what is claimed is:

1. A tree climbing apparatus comprising:
   (a) a climbing platform; a tree-engaging mechanism provided on one end of said climbing platform for engaging a tree; a seat carried by said climbing platform for supporting a person; an elongated cable adjusting guide carried by said climbing platform for lateral and medial displacement on one side of said climbing platform; an elongated cable retention guide carried by said climbing platform for lateral and medial displacement on the other side of said climbing platform, said cable adjusting guide and said cable retention guide each having a substantially perpendicular bend wherein said cable adjusting guide and said cable retention guide extend inwardly toward each other; a guide bar connecting frame terminating each of said cable adjusting guide and said cable retention guide, respectively; a cable provided on said climbing platform for extension around the tree above said tree-engaging mechanism and removably securing said climbing platform to the tree, said cable engaging said guide bar connecting frame; a cable adjusting mechanism provided on said cable adjusting guide for selectively tightening and loosening said cable around the tree, said cable having a first end secured on said cable adjusting mechanism and a second end for extension around the tree; a cable attachment mechanism provided on said cable retention guide for removably attaching said second end of said cable to said climbing platform; and (b) a foot support for removably engaging the tree beneath said climbing platform and supporting the person.

2. The tree climbing apparatus of claim 1 wherein said seat comprises at least one flexible net.

3. The tree climbing apparatus of claim 1 wherein said tree-engaging mechanism comprises a substantialy V-shaped engaging blade for receiving and engaging the tree.

4. The tree climbing apparatus of claim 1 wherein:
(a) said seat comprises at least one flexible net; and
(b) said tree-engaging mechanism comprises a substantially V-shaped engaging blade for receiving and engaging the tree.

5. The tree climbing apparatus of claim 1 wherein said cable adjusting mechanism comprises a cable adjusting handle slidably and adjustably mounted on said cable adjusting guide.

6. The tree climbing apparatus of claim 5 wherein said seat comprises at least one flexible net.

7. The tree climbing apparatus of claim 5 wherein said tree-engaging mechanism comprises a substantially V-shaped engaging blade for receiving and engaging the tree.

8. The tree climbing apparatus of claim 5 wherein:
(a) said seat comprises at least one flexible net; and
(b) said tree-engaging mechanism comprises a substantially V-shaped engaging blade for receiving and engaging the tree.

9. The tree climbing apparatus of claim 1 wherein said foot support comprises a foot platform; a second tree-engaging mechanism provided on one end of said foot platform for engaging the tree beneath said climbing platform; a second cable adjusting guide carried by said foot platform for lateral and medial displacement on one side of said foot platform; a second cable retention guide carried by said foot platform for lateral and medial displacement on the other side of said foot platform; a second cable provided on said foot platform for extension around the tree above said second tree-engaging mechanism and removable securing said foot platform to the tree; a second cable adjusting mechanism provided on said second cable adjusting guide for selectively tightening and loosening said second cable around the tree, said second cable having a first end secured on said second cable adjusting mechanism and a second end for extension around the tree; and a second cable attachment mechanism provided on said second cable retention guide for removably attaching said second end of said cable to said foot platform.

10. The tree climbing apparatus of claim 9 wherein said seat comprises at least one flexible net.

11. The tree climbing apparatus of claim 9 wherein said tree-engaging mechanism and said second tree-engaging mechanism each comprises a substantilly V-shaped engaging blade for receiving and engaging the tree.

12. The tree climbing apparatus of claim 9 wherein:
(a) said seat comprises at least one flexible net; and
(b) said tree-engaging mechanism and said second tree-engaging mechanism each comprises a substantially V-shaped engaging blade for receiving and engaging the tree.

13. The tree climbing apparatus of claim 9 wherein said cable adjusting mechanism comprises a cable adjusting handle slidably and adjustably mounted on said cable adjusting guide on said climbing platform and said second cable adjusting mechanism comprises a second cable adjusting handle slidably and adjustably mounted on said second cable adjusting guide on said foot platform.

14. The tree climbing apparatus of claim 13 wherein said seat comprises a pair of flexible nets.

15. The tree climbing apparatus of claim 13 wherein said tree-engaging mechanism and said second tree-engaging mechanism each comprises a substantially V-shaped engaging blade for receiving and engaging the tree.

16. The tree climbing apparatus of claim 13 wherein:
(a) said seat comprises a pair of flexible nets; and
(b) said tree-engaging mechanism and said second tree-engaging mechanism each comprises a substantially V-shaped engaging blade for receiving and engaging the tree.

17. A tree climbing apparatus comprising:
(a) a climbing platform including a climbing platform frame having a front end and a rear end; a first tree-engaging mechanism provided on said front end of said climbing platform frame for engaging a tree; a first cable adjusting guide bar having a rear end pivotally attached to said climbing platform frame and a front end disposed for lateral and medial displacement on one side of said climbing platform frame at said front end of said climbing platform frame; a first cable retention guide bar having a rear end pivotally attached to said climbing platform frame and a front end disposed for lateral and medial displacement on the other side of said climbing platform frame at said front end of said climbing platform frame; a seat spanning said climbing platform frame for supporting a person; a first cable adjusting handle slidably and adjustably mounted on said first cable adjusting guide bar, said first cable adjusting handle having a fulcrum slidably mounted on said first cable adjusting guide bar, an adjusting lever pivotally mounted on said fulcrum for removably engaging said first cable adjusting guide bar and a bias mechanism engaging said adjusting lever for normally biasing said adjusting lever in engagement with said first cable adjusting guide bar; a first cable provided on said climbing platform for extension around the tree above said first tree-engaging mechanism and removably securing said climbing platform to the tree, said first cable having one end attached to said first cable adjusting handle; a first cable attachment mechanism provided on the other end of said first cable for extentsion around the tree and removable attachment to said first cable retention guide bar, wherein said first cable forms a loop for extentsion around the tree and said loop can be adjusted in size by selectively sliding said cable adjusting handle along said first cable adjusting guide bar; and (b) a foot platform including a foot platform frame having a front end and a rear end; a support mesh mounted in said foot platform frame for supporting the person; a second tree-engaging mechanism provided on said front end of said foot platform frame for engaging the tree beneath said climbing platform; a second cable adjusting guide bar having a rear end pivotally attached to said foot platform frame and a front end disposed for lateral and medial displacement on one side of said foot platform frame at said front end of said foot platform frame; a second cable retention guide bar having a rear end pivotally attached to said foot platform frame and a front end disposed for lateral and medial displacement on the other side of said foot platform frame at said front end of said foot platform frame; a second cable adjusting handle slidably and adjustably mounted on said second cable adjusting guide bar and a second cable provided on said foot platform for extension around the tree above said second tree-engaging mechanism and removably securing said foot platform to the tree, said second cable having one end attached to said second cable adjusting handle; and a second cable attachment mechanism provided on the other end of said second cable for extension around the tree and removable attachment to said second cable retention guide bar.

18. The tree climbing apparatus of claim 17 wherein said seat comprises a first flexible net seat provided adjacent to said rear end of said climbing platform frame and a second flexible net seat provided adjacent to said front end of said climbing platform frame.

19. The tree climbing apparatus of claim 18 wherein said first tree engaging mechanism and said second tree engaging mechanism each comprises a substantially V-shaped engaging blade for receiving and engaging the tree.

20. A tree climbing apparatus comprising:

(a) a climbing platform including a climbing platform frame having a front end and a rear end; a first substantially V-shaped tree-engaging blade provided on said front end of said climbing platform frame for receiving and engaging the tree; a first cable adjusting guide bar having a rear end pivotally attached to said climbing platform frame and a front end disposed for lateral and medial displacement on one side of said climbing platform frame at said front end of said climbing platform frame; a first cable retention guide bar having a rear end pivotally attached to said climbing platform frame and a front end disposed for lateral and medial displacement on the other side of said climbing platform frame at said front end of said climbing platform frame, said first cable adjusting guide bar and said first cable retention guide bar each having a substantially perpendicular bend, wherein said front end of said first cable adjusting guide bar and said front end of said first cable retention guide bar extend inwardly toward each other; a guide bar connecting frame terminating said front end of said cable adjusting guide and said front end of said cable retention guide, respectively; a first fabric seat spanning said climbing platform frame adjacent to said rear end of said climbing platform frame and second fabric seat spanning said climbing platform frame adjacent to said front end of said climbing platform frame; a first cable adjusting handle slidably and adjustably mounted on said first cable adjusting guide bar and a first cable retention handle slidably and adjustably mounted on said cable retention guide bar; a first tree cable having one end attached to said first cable adjusting handle and a second end for extension around the tree above said tree-engaging blade and removable attachment to said first cable retention handle, said first tree cable engaging said guide bar connecting frame; and (b) a foot platform including a foot platform frame having a front end and a rear end; a second substantially V-shaped tree-engaging blade provided on said front end of said foot platform frame for receiving and engaging the tree beneath said climbing platform; a foot support mesh mounted in said foot platform frame for supporting the person; a second cable adjusting guide bar having a rear end pivotally attached to said foot platform frame and a front end disposed for lateral and medial displacement on one side of said foot platform frame at said front end of said foot platform frame; a second cable retention guide bar having a rear end pivotally attached to said foot platform frame and a front end disposed for lateral and medial displacement on the other side of said foot platform frame at said front end of said foot platform frame; a second cable adjusting handle slidably and adjustably mounted on said second cable adjusting guide bar and a second cable retention handle slidably and adjustably mounted on said second cable retention guide bar; and a second tree cable having one end attached to said second cable adjusting handle and a second end for extension around the tree above said second tree-engaging blade and removable attachment to said second cable retention handle.

* * * * *